Patented Feb. 10, 1925.

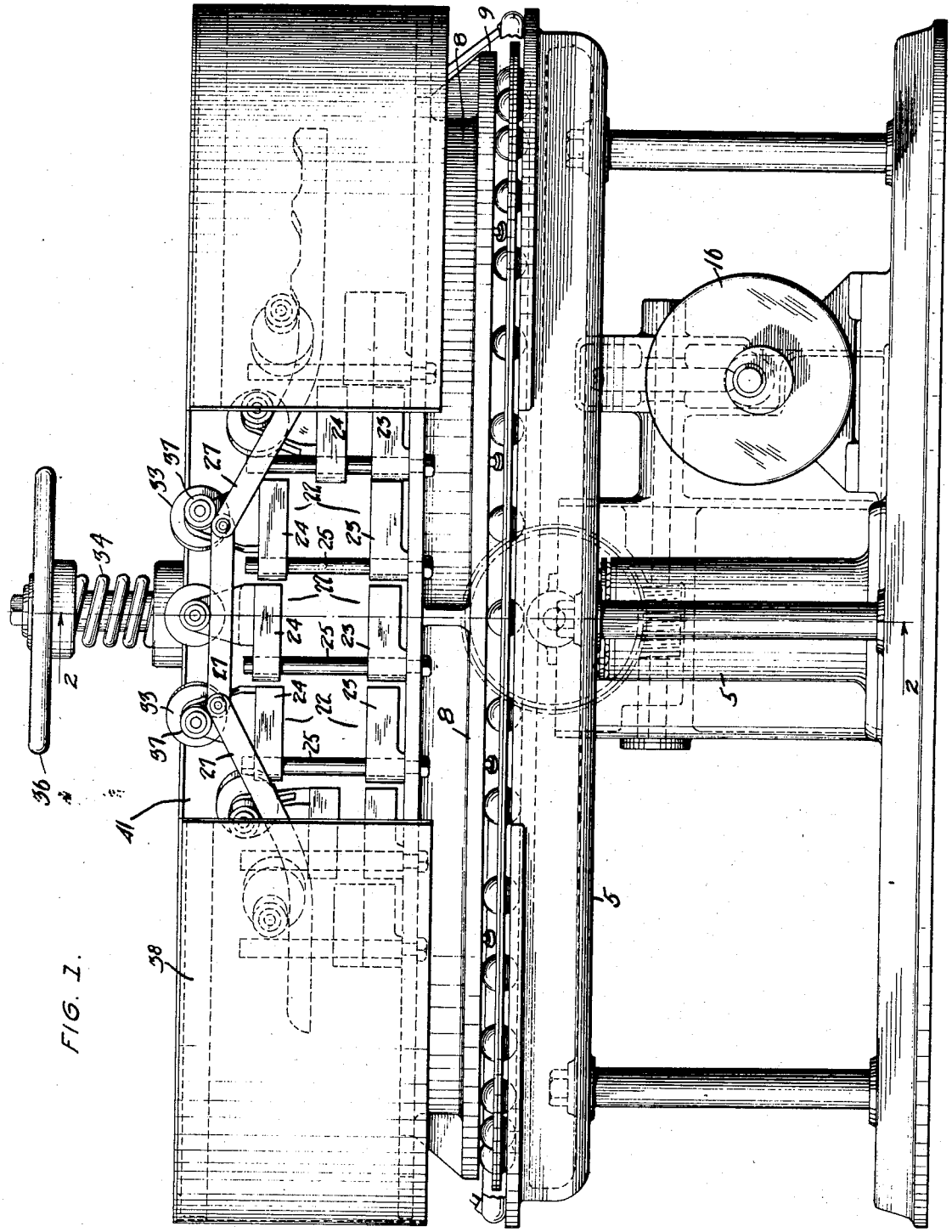

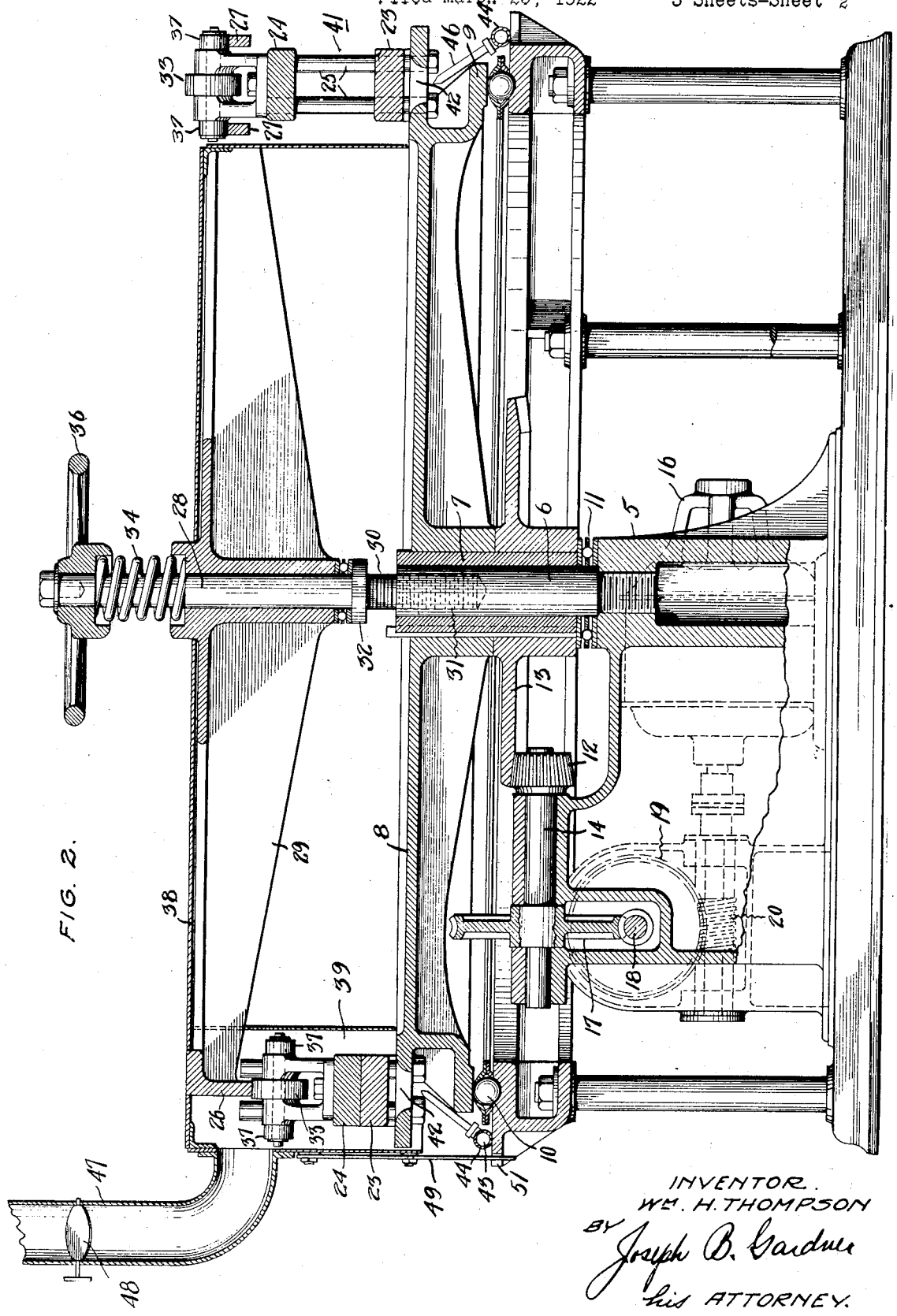

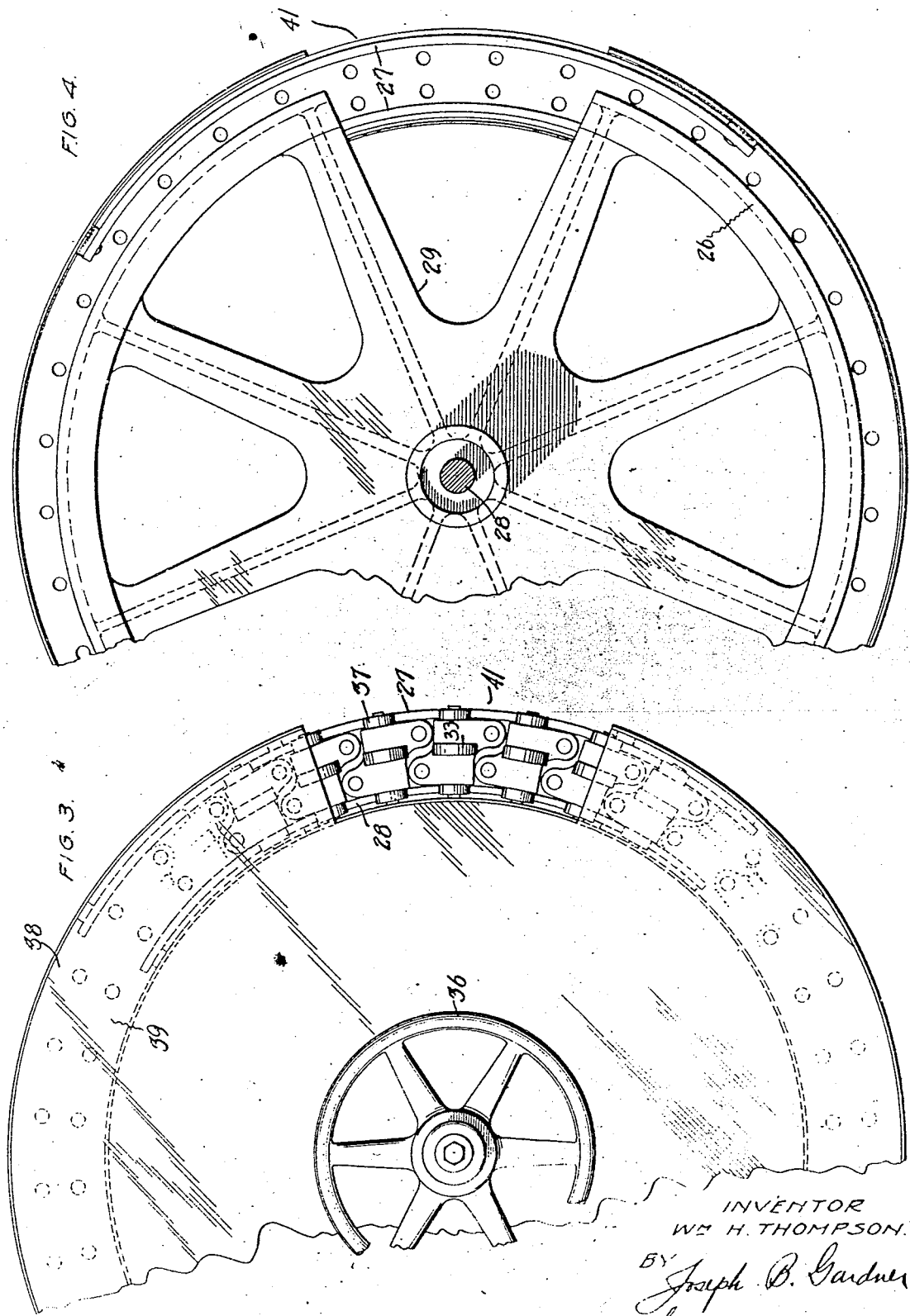

1,525,629

UNITED STATES PATENT OFFICE.

WILLIAM H. THOMPSON, OF BERKELEY, CALIFORNIA, ASSIGNOR OF ONE-HALF TO LEON HOMMEL, OF OAKLAND, CALIFORNIA.

MOLDING PRESS.

Application filed March 25, 1922. Serial No. 546,676.

*To all whom it may concern:*

Be it known that I, WILLIAM H. THOMPSON, a citizen of the United States, and a resident of Berkeley, county of Alameda, and State of California, have invented a new and useful Molding Press, of which the following is a specification.

My invention relates to a multiple molding press in which the articles are pressed into shape between sets of dies and subjected to a baking action while held between the dies.

An object of the invention is to provide a molding press of the character described in which the articles may be molded and dried by causing the dies to move in a circular path within a baking oven.

Another object of the invention is to provide a molding and baking press in which the heat may be applied to the molded articles in such direct manner that a minimum application of heat will suffice to quickly bake the article hard and dry.

A further object of the invention is to provide a press in which a multiplicity of sets of dies may be resiliently pressed together with a single spring.

A still further object of the invention is to provide a press of the character described which will permit of its ready assembly or disassembly.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a front view of the press.

Figure 2 is a vertical section taken on the line 2—2 of Figure 1.

Figure 3 is a fragmentary plan view of the press.

Figure 4 is a view similar to Figure 3 with the top plate and dies removed.

Briefly expressed the press as here shown comprises a shaft having mounted thereon a rotatable carrier on which is supported a plurality of dies. The dies travel within a fixed annular baking oven, the bottom of which is open whereby jets of flame issuing from a gas burner may be directed against the moving dies. The dies comprise male and female members one of which is movable vertically toward and from the other so as to press the material into proper shape and allow the molded article to be removed. A pressure member is provided for pressing and holding the dies together, and a single spring is utilized for affording a resilient engagement between said pressure member and the dies. The front side of the oven is provided with an opening, and means are provided for causing the dies to separate when they pass said opening, thus enabling the removal of the finished articles and the refilling of the dies. The pressure member as well as the oven are mounted on a detachable section of the main shaft so that they may be readily removed when necessary.

A detailed description follows:

The press comprises a suitable frame 5 which supports a fixed vertical shaft or stud 6. Keyed or otherwise secured to a sleeve 7 which is rotatably mounted on the shaft, is a carrier 8 having a depending flange 9 adapted to rest on an annular ball race 10 provided adjacent the outer edge of the frame. A thrust bearing 11 is interposed between the sleeve and frame so as to further reduce the friction between the carrier and frame. Rotation of the sleeve and therefore the carrier is effected by means of the bevel gears 12 and 13, the latter of which is preferably secured to the sleeve in the same manner as the carrier. The shaft 14 carrying the gear 12 is driven by a motor 16 through the intervention of one or more sets of worm gears 17, 18, 19 and 20.

Supported on the carrier above the flange 9 are a plurality of dies arranged in sets 22. Each set comprises a stationary member 23 and a relatively movable member 24, the latter being preferably the male and the former the female. The dies are fixed to the carrier by means of guide studs 25, the upper or movable die 24 being slidably mounted thereon for vertical displacement toward and from the stationary or lower die 23. The upper dies 24 are respectively pressed downward and elevated by means of a compression rail 26 and a lifting rail 27, both of which are adapted to be held in fixed position when the carrier and the dies rotate. Mounted on an extension or separable section 28 of the shaft 6 is spider 29 which as here shown is formed integral with the compression rail 26. The shaft section 28 is provided at its lower end with a threaded portion 30 which is arranged to engage in a similarly threaded socket 31 formed in the frame. A collar 32 is preferably formed on the section 28 upon which the spider may be supported when the compression rail is disengaged from the dies. Each of the movable dies is provided with a roller 33 upon which the compression rail is adapted to bear when downward pressure is to be exerted on the dies. The necessary force for pressing the dies together and holding them tightly closed is afforded through the medium of a single spring 34 which encircles the section 28 and tends to press the spider against the collar 32, a hand wheel 36 secured to the section 28 serving to receive the thrust of the spring at its upper end. It will be understood that rotation of the hand wheel will cause the threaded portion 30 to move forward or backward in the socket, thereby enabling the adjustment of the pressure exerted upon the dies. Each of the dies 24 is also provided with a pair of rollers 37 which are adapted to rest upon and ride over the lifting rail 27 when the pressure roller is disengaged from the rail 26. The rail 27 is preferably positioned at the front of the press so that as the upper die is elevated or separated from the lower, an operator may conveniently remove the molded article and refill the die for another operation.

Preferably supported on the spider is a baking oven 38 provided with an annular heating chamber 39 in which the dies are adapted to travel during the rotation of the carrier. The sides and top of the chamber 39 are preferably completely enclosed except for the side opening 41 at the front, which allows the operator access to the dies, it being remembered that the dies are in their separated open position at this portion of the press. The bottom of the heating chamber is provided with an opening 42 which may extend completely around the chamber. Supported on the frame and underlying the opening 42 is a gas-burner 43 comprising a cylindrical pipe 44 provided with a plurality of nozzles 46 which are adapted to direct the flame through the opening 42 directly into the chamber and against the dies. It will thus be clear that a most direct application of the heat is made, and a thorough baking of the molded article will be speedily effected. The burnt gas may exit through the outlet-pipe 47 which is provided with a suitable damper 48.

It will be noted that the construction herein provided for enables the press to be readily assembled or disassembled. By simply rotating the wheel until the section 28 is disengaged from the frame socket, the entire super-structure including the oven, spider, rails, etc., may be removed to allow of any repairs being effected. The reverse operation will enable the said parts to be just as readily replaced. Rotation of the superstructure with respect to the carrier is preferably prevented by means of a feather 49 which is fixed to the oven and engages in a recess 51 formed at an edge of the frame.

The operation of the press is as follows:

Owing to the use of the worm gears the speed of rotation of the carrier is comparatively slow. This enables the operator who is adapted to be stationed at the oven opening, to fill the female or lower die with the molding material without stopping the machine. The press in its present embodiment is particularly adapted for forming molded articles of papier-mâché and other compounds which contain starch or other binding medium, and the material when placed in the dies is preferably in a semi-solid state. When said die has been filled and commences to leave the opening the rollers 37 ride down on the inclined face of the lifting rail whereby the upper die which is associated with said female die is allowed to gradually descend. As soon as the rollers 37 become disengaged from the lifting rail, the roller 33 moves under the compression rail and the two dies are thence held together by the force of the spring 34. The dies are thus held until the roller 33 moves from under the compression rail at which time the molding material will have set and have become baked dry and hard. When the roller 33 leaves the compression rail, the rollers 37 once again mount the lifting rail and the dies are gradually separated and enter the oven opening. The operator may then remove the finished article from the die and then refill the latter with the raw material.

I claim:

1. In a molding machine, a shaft, a rotatable carrier mounted about said shaft, a plurality of dies supported on said carrier, a segmental die-compressing member movable longitudinally relative to said shaft and adapted to be engaged by said dies during the rotation of said carrier, and a spring mounted centrally of said member adapted to hold said member resiliently engaged with said dies, and means for varying the pressure between said member and said dies.

2. In a molding machine, a shaft, a carrier mounted for rotation on said shaft, a plurality of dies supported on said carrier, an extension removably secured to said shaft by screw-thread engagement, a segmental die-compressing member carried on said extension, and a spring encircling said shaft extension adapted to retain said compression member in resilient engagement with said dies.

3. In a molding machine, a shaft having a removable section, a rotatable carrier mounted on said shaft, a plurality of dies supported on said carrier, a die-compressing member carried on said section, an oven carried by said section and enclosing said dies, and means for resiliently retaining said compressing member engaged with said dies.

4. A molding machine, comprising a baking oven a rotatable carrier, a plurality of dies supported on said carrier for rotation therewith and arranged within said oven, pressure applying devices for said dies enclosed within said oven, and means without said oven for adjusting the pressure exerted by said devices.

5. A molding press comprising an oven having an enclosed annular heating chamber, a rotatable carrier, a plurality of sets of dies supported on said carrier and arranged within said chamber, a roller mounted on one of the dies of each of said sets, a rail arranged in said oven adapted to be engaged by the roller to elevate said die, a second roller mounted on said die, and a resiliently pressed track arranged in said oven and adapted to engage said second roller and press said die against its associate.

6. A molding machine, comprising a baking oven, a rotatable carrier, a plurality of dies supported on said carrier for rotation therewith and arranged within said oven, pressure applying devices for said dies enclosed within said oven, and means for simultaneously adjusting the pressure exerted by said devices.

7. A molding machine, comprising a baking oven, a rotatable carrier, a plurality of cooperating dies supported on said carrier for rotation therewith and arranged to move into and out of said oven, compression means adapted to resiliently hold the cooperating dies together while in the oven and arranged to be released when the dies are without said oven.

In testimony whereof, I have hereunto set my hand at Oakland, this 15th day of March, 1922.

WILLIAM H. THOMPSON.